(12) United States Patent
Liu et al.

(10) Patent No.: US 10,901,201 B2
(45) Date of Patent: Jan. 26, 2021

(54) REFLECTION TYPE DISPLAY DEVICE AND DISPLAY APPARATUS

(71) Applicants: Beijing BOE Special Display Technology Co., Ltd., Beijing (CN); BOE Technology Group Co., Ltd., Beijing (CN)

(72) Inventors: Lihua Liu, Beijing (CN); Zhidong Wang, Beijing (CN)

(73) Assignees: BEIJING BOE SPECIAL DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 102 days.

(21) Appl. No.: 16/247,117

(22) Filed: Jan. 14, 2019

(65) Prior Publication Data
US 2019/0243124 A1    Aug. 8, 2019

(30) Foreign Application Priority Data

Feb. 8, 2018 (CN) .......................... 2018 1 0126511

(51) Int. Cl.
*G02B 26/00* (2006.01)
(52) U.S. Cl.
CPC .................... *G02B 26/004* (2013.01)
(58) Field of Classification Search
CPC ................................ G02B 26/004
USPC ................................ 359/290, 291
See application file for complete search history.

(56) References Cited

U.S. PATENT DOCUMENTS

| 10,509,246 B2 | 12/2019 | Zhang et al. |
| 10,510,537 B2 | 12/2019 | Wang et al. |
| 2018/0088435 A1 | 3/2018 | Liang et al. |
| 2018/0190484 A1* | 7/2018 | Wang .................... G02F 1/1343 |
| 2018/0299715 A1 | 10/2018 | Zhang et al. |

FOREIGN PATENT DOCUMENTS

| CN | 101162341 A | 4/2008 |
| CN | 105911691 A | 8/2016 |
| CN | 106200199 A | 12/2016 |
| CN | 106324868 A | 1/2017 |

(Continued)

OTHER PUBLICATIONS

First Office Action, including Search Report, for Chinese Patent Application No. 201810126511.6, dated Jan. 21, 2020, 13 pages.

*Primary Examiner* — James C. Jones
(74) *Attorney, Agent, or Firm* — Westman, Champlin & Koehler, P.A.

(57) ABSTRACT

A reflection type display device and a display apparatus are provided. The reflection type display device includes: an upper transparent substrate, a lower substrate, and a display unit provided between the upper transparent substrate and the lower substrate. The display unit includes an electrode, a refractive deformation member and a black absorption layer. The refractive deformation member is configured to deform under control of the electrode to switch between a first state and a second state. In the first state, incident light through the upper transparent substrate is totally reflected by the refractive deformation member to form a bright state; and in the second state, incident light passes through the refractive deformation member and is absorbed by the black absorption layer to form a dark state.

18 Claims, 7 Drawing Sheets

(56) References Cited

FOREIGN PATENT DOCUMENTS

| CN | 206115023 U | 4/2017 |
|---|---|---|
| CN | 106707643 A | 5/2017 |
| DE | 3416206 A1 | 11/1984 |
| JP | 2000075223 A | 3/2000 |

* cited by examiner

REFLECTION TYPE DISPLAY DEVICE AND DISPLAY APPARATUS

CROSS-REFERENCE TO RELATED APPLICATION

This application claims a priority to Chinese Patent Application No. 201810126511.6 filed on Feb. 8, 2018, the disclosure of which is incorporated in its entirety by reference herein.

TECHNICAL FIELD

The present disclosure relates to the field of display technology, specifically to a reflection type display technology, and in particular to a reflection type display device and a display apparatus.

BACKGROUND

At present, various display technologies are emerging. Research on, for example, total reflection display technology has become a hot topic because of its low cost and high reflectivity.

Reflection type display devices in the related technologies have a complicated process and limited display performance.

SUMMARY

In a first aspect, an embodiment of the present disclosure provides a reflection type display device, including an upper transparent substrate, a lower substrate, and a display unit provided between the upper transparent substrate and the lower substrate.

The display unit includes an electrode, a refractive deformation member and a black absorption layer.

The refractive deformation member is configured to deform under control of the electrode to switch between a first state and a second state.

In the first state, incident light through the upper transparent substrate is totally reflected by the refractive deformation member to form a bright state; and in the second state, incident light through the upper transparent substrate passes through the refractive deformation member and is absorbed by the black absorption layer to form a dark state.

In some embodiments of the present disclosure, the refractive deformation member includes a first part having a refractive index greater than a set value and a second part having a refractive index less than the set value.

The first part is made of a deformable material and the second part is a gas or a liquid; or the first part is a gas or a liquid and the second part is made of a deformable material.

In some embodiments of the present disclosure, the electrode is a heating electrode; the refractive deformation member is provided between the electrode and the black absorption layer; and the first part is made of a deformable material and the second part is a gas or a liquid.

In some embodiments of the present disclosure, the first part is made of a thermal expansion material; the first part is in the first state when thermally expanded under control of the heating electrode; and the first part is in the second state when not thermally expanded.

In some embodiments of the present disclosure, the first part is made of a negative thermal expansion material; the first part is in the first state when not deformed; and the first part is in the second state when contracted under the control of the heating electrode.

In some embodiments of the present disclosure, the electrode is a heating electrode; the electrode is provided on the black absorption layer, or, the electrode and the black absorption layer are combined as a black electrode; and the first part is a gas or a liquid, and the second part is made of a deformable material.

In some embodiments of the present disclosure, the second part is made of a negative thermal expansion material; the second part is in the first state when contracted under the control of the heating electrode; and the second part is in the second state when not deformed.

In some embodiments of the present disclosure, the second part is made of a thermal expansion material; the second part is in the first state when not deformed; and the second part is in the second state when thermally expanded under the control of the heating electrode.

In some embodiments of the present disclosure, material of the upper transparent substrate includes a glass material.

In some embodiments of the present disclosure, material of the black absorption layer includes a resin material.

In some embodiments of the present disclosure, the electrode includes an indium tin oxide (ITO) electrode.

In some embodiments of the present disclosure, the thermal expansion material includes a Polydimethylsiloxane (PDMS) material.

In some embodiments of the present disclosure, the second part includes air.

In some embodiments of the present disclosure, in the case that the electrode and the black absorption layer are combined as the black electrode, the material of the black electrode includes manganese (Mn) metal or chromium (Cr) metal.

In the case that the electrode is provided on the black absorption layer, the electrode includes an indium tin oxide (ITO) electrode.

In some embodiments of the present disclosure, the first part includes silicone oil.

In some embodiments of the present disclosure, the electrode includes a first electrode and a second electrode. The first electrode is provided between the upper transparent substrate and the refractive deformation member. The second electrode is provided between the refractive deformation member and the black absorption layer, or the second electrode and the black absorption layer are combined as a black electrode.

The first part is made of an electroactive deformable material; the second part is a gas or a liquid; and the first part is deformed under control of a field voltage of the first electrode and the second electrode to switch between the first state and the second state. Or, the first part is a gas or a liquid; the second part is made of an electroactive deformable material; and the second part is deformed under control of a field voltage of the first electrode and the second electrode to switch between the first state and the second state.

In some embodiments of the present disclosure, the first electrode includes an ITO electrode.

In the case that the second electrode and the black absorption layer are combined as the black electrode, material of the black electrode includes Mn metal or Cr metal.

In the case that the electrode is provided on the black absorption layer, the second electrode includes an ITO electrode.

In some embodiments of the present disclosure, the electroactive deformable material includes a conductive polymer or a liquid crystal elastomer.

In some embodiments of the present disclosure, the reflection type display device further includes walls provided at two sides of the display unit.

In a second aspect, an embodiment of the present disclosure further provides a display apparatus including a reflection type display device. The reflection type display device includes an upper transparent substrate, a lower substrate, and a display unit provided between the upper transparent substrate and the lower substrate.

The display unit includes an electrode, a refractive deformation member and a black absorption layer.

The refractive deformation member is configured to deform under control of the electrode to switch between a first state and a second state.

In the first state, incident light through the upper transparent substrate is totally reflected by the refractive deformation member to form a bright state; and in the second state, incident light through the upper transparent substrate passes through the refractive deformation member and is absorbed by the black absorption layer to form a dark state.

BRIEF DESCRIPTION OF THE DRAWINGS

According to detailed descriptions of embodiments in conjunction with the drawings, features, objects and advantages of the present disclosure will become more apparent.

DETAILED DESCRIPTION

The present disclosure will be further described in detail hereinafter in conjunction with the drawings and embodiments. It should be understood that the specific embodiments described herein are merely to illustrate the present disclosure, rather than to limit the present disclosure. It should also be noted that the drawings only show the parts related to the present disclosure for the convenience of description.

It should be noted that the embodiments in the present disclosure and features in the embodiments can be combined with each other as long as no conflict is caused. The present disclosure will be described in detail hereinafter with reference to the drawings and embodiments.

Figure 1:
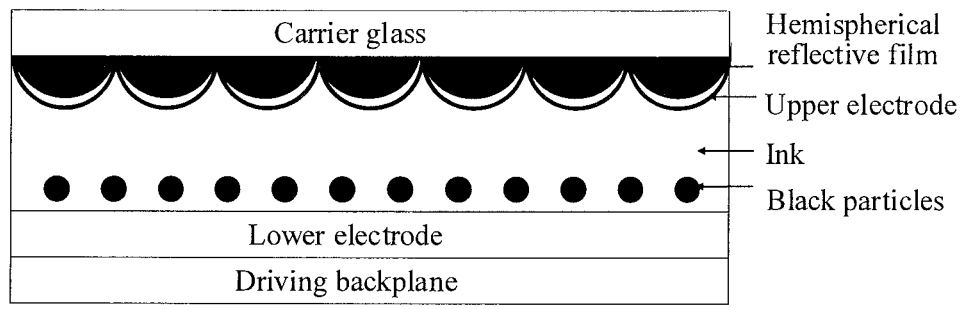
FIG. 1 is a schematic structural view of a reflection type display device in the related technologies.

FIG. 1 shows a structure of a reflection type display device in the related technologies, including a carrier glass, a hemispherical reflective film, an upper transparent electrode, ink, black particles, a lower electrode and a driving backplane in sequence.

Figure 2:
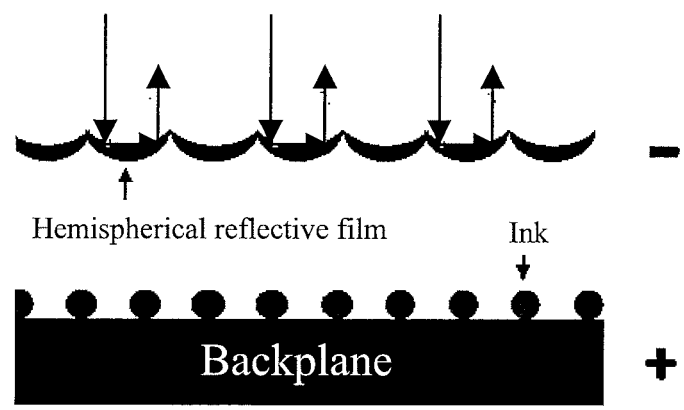
FIG. 2 is a schematic principle view showing a reflection type display device in a bright state in the related technologies.
Figure 3:
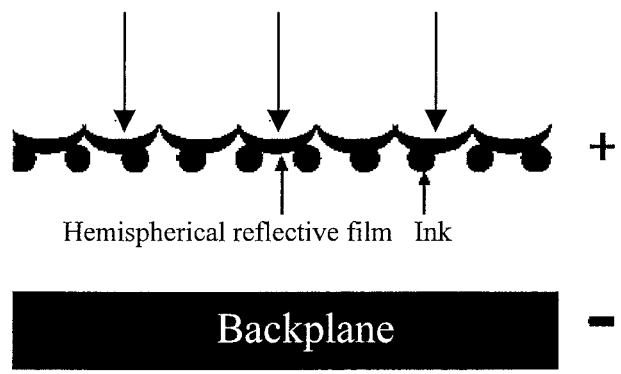
FIG. 3 is a schematic principle view showing a reflection type display device in a dark state in the related technologies.

FIG. 2 and FIG. 3 show a display principle of the reflection type display device in the related technologies. In FIG. 2, when a negative voltage and a positive voltage are respectively applied to the upper substrate and the lower substrate, negatively charged particles are attracted near the lower substrate. In this case, light enters from an optically denser medium (the hemispherical reflective film) to a optically thinner medium (the ink), and is totally reflected. Accordingly, the reflection type display device is in a bright state. In FIG. 3, when a positive voltage and a negative voltage are respectively applied to the upper substrate and the lower substrate, negatively charged black particles envelop the hemispherical reflective film. In this case, incident light is absorbed by the black particles. Accordingly, the reflection type display device is in a dark state.

According to the display principle mentioned above, it can be seen that the reflection type display device in the related technologies has the following disadvantages.

1) The display relates to particles, which leads to a complex process of the reflection type display device; and the particles are easy to agglomerate, thus an uneven distribution of particles on the hemispherical reflective film may be caused, affecting display performance.

2) The hemispherical reflective film requires a nanoimprint process, which is difficult.

3) A curved electrode needs to be formed on the hemispherical reflective film, which is difficult in the process.

In view of the disadvantages in the related technologies, the present disclosure provides a reflection type display device and a display apparatus to improve display performances and reduce process difficulties.

Figure 4:
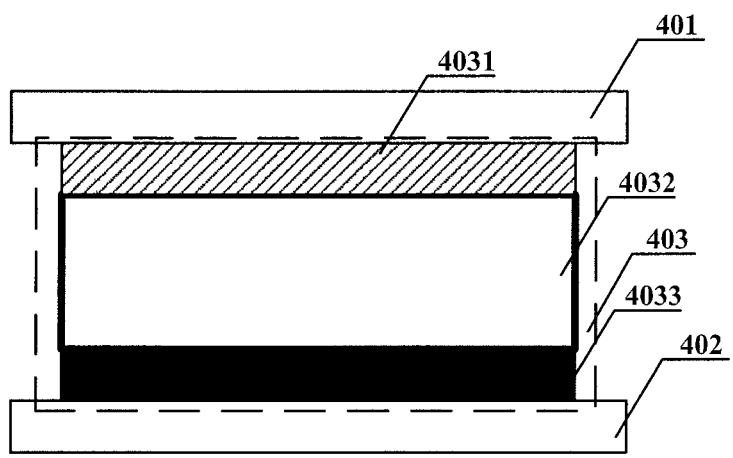
FIG. 4 is a schematic structural view of a reflection type display device according to an embodiment of the present disclosure.

As shown in FIG. 4, a reflection type display device according to an embodiment of the present disclosure includes an upper transparent substrate 401, a lower substrate 402 and a display unit 403.

The display unit 403 is provided between the upper transparent substrate 401 and the lower substrate 402. The display unit 403 includes an electrode 4031, a refractive deformation member 4032 and a black absorption layer 4033.

The refractive deformation member 4032 is configured to deform under control of the electrode 4031 to switch between a first state and a second state. In the first state, incident light through the upper transparent substrate 401 is totally reflected by the refractive deformation member 4032 to form a bright state. In the second state, incident light through the upper transparent substrate 401 passes through the refractive deformation member 4032 and is absorbed by the black absorption layer 4033 to form a dark state.

Since the reflection type display device switches between the first state (in this case, the bright state is formed) and the second state (in this case, the dark state is formed) through deformation of the refractive deformation member 4032 without participation of the particles, a situation where agglomeration or uneven distribution of the particles affects display performance will not occur. In addition, the nano-imprint process and the curved electrode are not needed for the reflection type display device, which results in reduced difficulty in manufacture process.

In order to achieve total reflection more easily, the refractive deformation member may include two parts: one part near the incident light has a high refractive index; the other part away from the incident light has a low refractive index; and the greater the difference in refractive indexes of the two parts becomes, the less the degree of deformation is required.

A deformable material may be used to manufacture the part having a greater refractive index, or may be used to manufacture the part having a lower refractive index.

The refractive deformation component 4032 may specifically include:

a first part having a refractive index greater than a set value and a second part having a refractive index less than the set value.

The first part is made of a deformable material, and the second part is a gas or a liquid. Or, the first part is a gas or a liquid, and the second part is made of a deformable material.

Hereinafter, the reflection type display device according to the embodiments of the present disclosure will be described in detail in conjunction with specific embodiments.

In some embodiments of the present disclosure, the electrode may be a heating electrode, and the part having a greater refractive index may be made of the deformable material.

Figure 5:
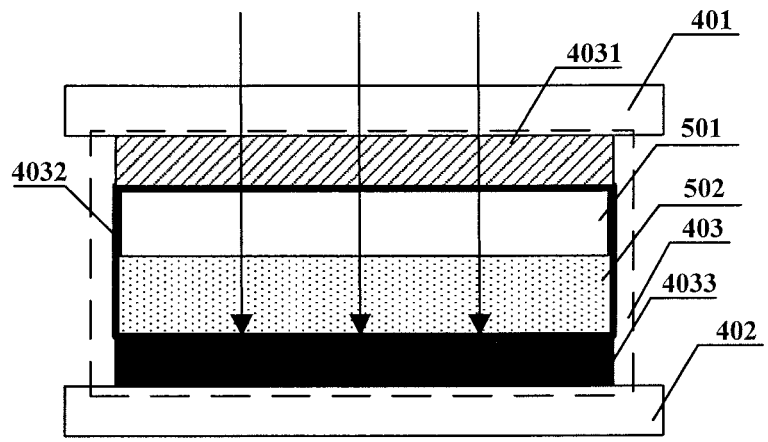
FIG. 5 is a schematic view of a reflection type display device according to an embodiment of the present disclosure.

As shown in FIG. 5, the electrode 4031 is a heating electrode, and the refractive deformation member 4032 is provided between the electrode 4031 and the black absorption layer 4033.

In this case, the refractive deformation member 4032 includes a first part 501 having a refractive index greater than a set value and a second part 502 having a refractive index less than the set value. The first part 501 is made of the deformable material and the second part 502 is the gas or the liquid.

The first part 501 having the refractive index greater than the set value may expand or contract under heating effect of the electrode 4031 to achieve switching between the first state and the second state.

Figure 6:
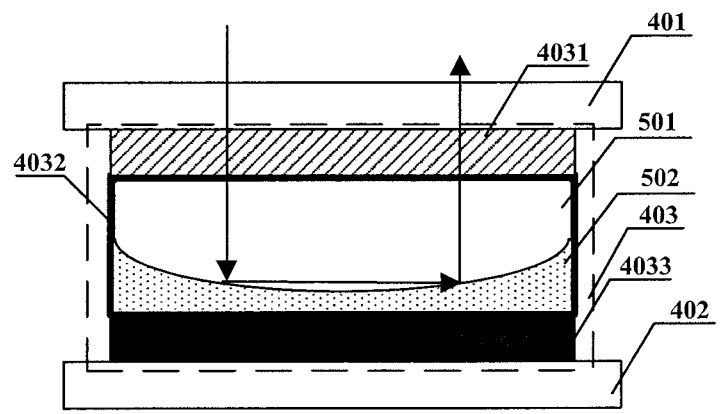
FIG. 6 is a schematic view of a reflection type display device according to an embodiment of the present disclosure.

Specifically, when the first part 501 is made of a thermal expansion material, the refractive deformation member 4032 includes: the first part 501 made of the thermal expansion material, and the second part 502. The first part 501 made of the thermal expansion material is in the first state when thermally expanded under the control of the heating electrode, as shown in FIG. 6. In this case, incident light through the upper transparent substrate 401 is totally reflected at a boundary between the first part 501 made of the thermal expansion material and the second part 502. The first part 501 made of the thermal expansion material is in the second state when not expanded, as shown in FIG. 5. In this case, incident light through the upper transparent substrate 401 passes through the first part 501 made of the thermal expansion material and the second part 502, and is absorbed by the black absorption layer 4033.

When the first part 501 is made of a negative thermal expansion material, the refractive deformation member 4032 includes: the first part 501 made of the negative thermal expansion material, and the second part 502. The first part 501 made of the negative thermal expansion material is in the first state when not deformed, as shown in FIG. 6. In this case, incident light through the upper transparent substrate 401 is totally reflected at a boundary between the first part 501 made of the negative thermal expansion material and the second part 502. The first part 501 made of the negative thermal expansion material is in the second state when contracted under the control of the heating electrode, as shown in FIG. 5, incident light through the upper transparent substrate 401 passes through the first part 501 made of the negative thermal expansion material and the second part 502, and is absorbed by the black absorption layer 4033.

In some embodiments of the present disclosure, material of the upper transparent substrate 401 may be a glass material.

In some embodiments of the present disclosure, the electrode 4031 may include an indium tin oxide (ITO) electrode.

In some embodiments of the present disclosure, the thermal expansion material having the refractive index greater than the set value may include: a Polydimethylsiloxane (PDMS) material.

In some embodiments of the present disclosure, the second part 502 may include: air.

In some embodiments of the present disclosure, material of the black absorption layer 4033 may specifically include: a resin material.

In some embodiments of the present disclosure, the electrode may be a heating electrode, and the part having a lower refractive index may be made of the deformable material.

Figure 7:
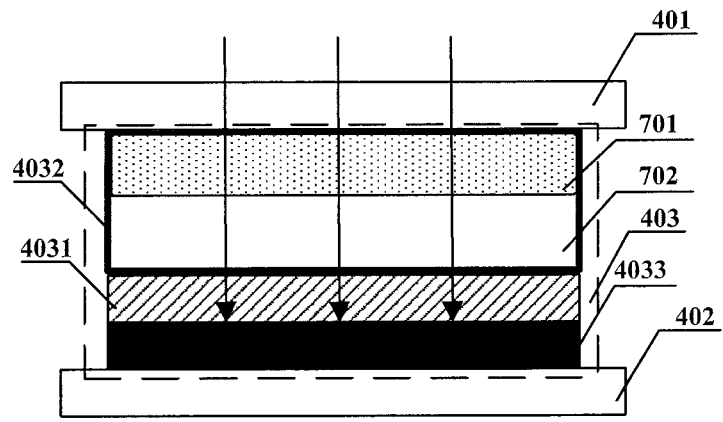
FIG. 7 is a schematic view of a reflection type display device according to an embodiment of the present disclosure.

As shown in FIG. 7, the electrode 4031 is a heating electrode and is provided on the black absorption layer 4033. In some other embodiments of the present disclosure, the electrode may be combined with the black absorption layer to be provided as a black electrode, to reduce complexity of the process.

The refractive deformation member 4032 includes a first part 701 having a refractive index greater than a set value and a second part 702 having a refractive index less than the set value. The first part 701 is a gas or a liquid, and the second part 702 is made of a deformable material.

The second part 702 having the refractive index less than the set value may expand or contract under heating effect of the electrode 4031 to achieve switching between the first state and the second state.

Figure 8:
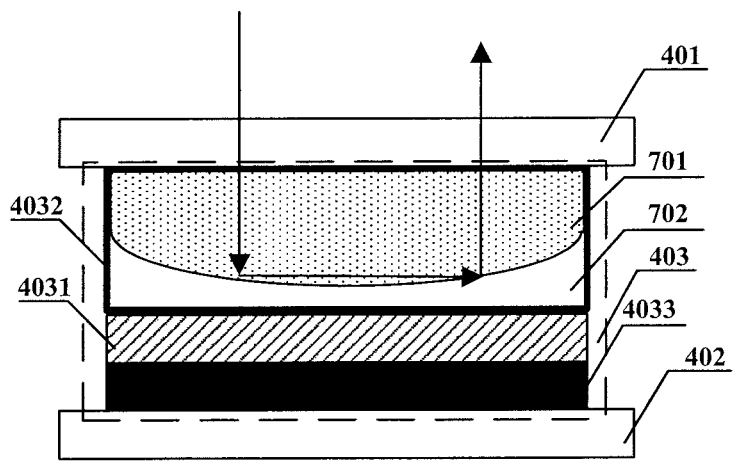
FIG. 8 is a schematic view of a reflection type display device according to an embodiment of the present disclosure.

In a case that the second part 702 is made of a negative thermal expansion material, the refractive deformation member 4032 includes: the first part 701, and the second part 702 made of the negative thermal expansion material. The second part 702 made of the negative thermal expansion material is in the first state when contracted under the control of the heating electrode 4031, as shown in FIG. 8. In this case, incident light through the upper transparent substrate 401 is totally reflected at a boundary between the first part 701 and the second part 702 made of the negative thermal expansion material. The second part 702 made of the negative thermal expansion material is in the second state when not deformed, as shown in FIG. 7. In this case, incident light through the upper transparent substrate 401 passes through the first part 701 and the second part 702 made of the negative thermal expansion material, and is absorbed by the black absorption layer 4033.

In a case that the second part 702 is made of a thermal expansion material, the refractive deformation member 4032 includes: the first part 701, and the second part 702 made of the thermal expansion material. The second part 702 made of the thermal expansion material is in the first state when not deformed, as shown in FIG. 8. In this case, incident light through the upper transparent substrate 401 is totally reflected at a boundary between the first part 701 and the second part 702 made of the thermal expansion material. The second part 702 made of the thermal expansion material is in the second state when thermally expanded under the control of the heating electrode 4031, as shown in FIG. 7, incident light through the upper transparent substrate 401 passes through the first part 701 and the second part 702 made of the thermal expansion material, and is absorbed by the black absorption layer 4033.

In some embodiments of the present disclosure, material of the upper transparent substrate 401 may be a glass material.

In some embodiments of the present disclosure, in the case that the electrode is combined with the black absorption layer to be provided as a black electrode, material of the black electrode may include: manganese (Mn) metal or chromium (Cr) metal.

In some embodiments of the present disclosure, in the case that the electrode is provided on the black absorption layer, the electrode may include: an indium tin oxide (ITO) electrode; and material of the black absorption layer 4033 may include: a resin material.

In some embodiments of the present disclosure, the first part 701 may include: silicone oil.

In some embodiments of the present disclosure, the electrode may include a first electrode and a second electrode which are respectively provided at two sides of the refractive deformation member. The refractive deformation member is deformed under an electric field of the first electrode and the second electrode to switch between the first state and the second state.

Figure 9:
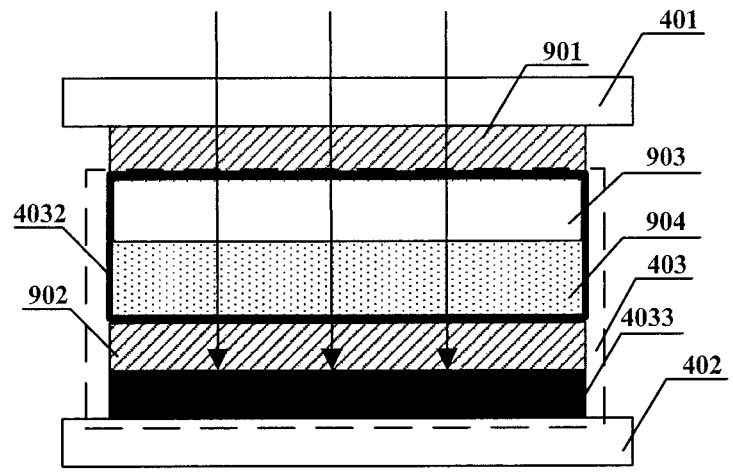
FIG. 9 is a schematic view of a reflection type display device according to an embodiment of the present disclosure.

As shown in FIG. 9, the electrode 4031 includes a first electrode 901 and a second electrode 902. The first electrode 901 is provided between the upper transparent substrate 401 and the refractive deformation member 4032. The second electrode 902 is provided between the refractive deformation member 4032 and the black absorption layer 4033. In some other embodiments of the present disclosure, the second electrode is combined with the black absorption layer to be provided as a black electrode.

As shown in FIG. 9, in the case that the part having a greater refractive index is made of the deformable material, the refractive deformation member 4032 includes: a first part 903 having a refractive index greater than a set value and a second part 904 having a refractive index less than the set value. The first part 903 is made of an electroactive deformable material, and the second part 904 is a gas or a liquid.

Figure 10:
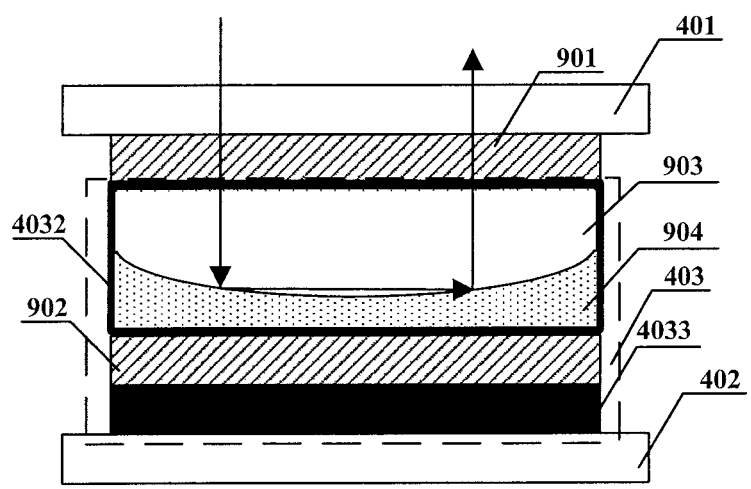
FIG. 10 is a schematic view of a reflection type display device according to an embodiment of the present disclosure.

The first part 903 made of the electroactive deformable material in the refractive deformation member is deformed under the action of a field voltage of the first electrode 901 and the second electrode 902 to switch between the first state and the second state. As shown in FIG. 10, in the first state, incident light through the upper transparent substrate 401 is totally reflected at a boundary between the first part 903 made of the electroactive deformable material and the second part 904. As shown in FIG. 9, in the second state, incident light through the upper transparent substrate 401 passes through the first part 903 made of the electroactive deformable material and the second part 904, and is absorbed by the black absorption layer 4033.

Figure 11:
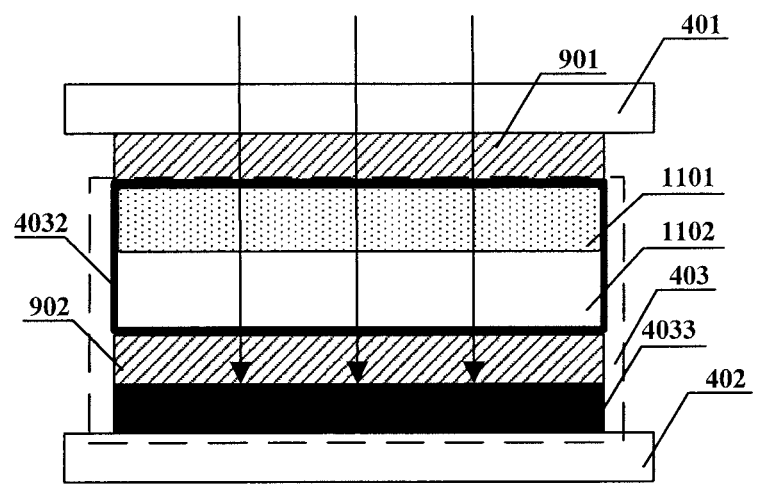
FIG. 11 is a schematic view of a reflection type display device according to an embodiment of the present disclosure.

As shown in FIG. 11, in the case that the part having a lower refractive index is made of the deformable material, the refractive deformation member 4032 includes: a first part 1101 having a refractive index greater than a set value and a second part 1102 having a refractive index less than the set value. The first part 1101 is a gas or a liquid, and the second part 1102 is made of an electroactive deformable material.

Figure 12:
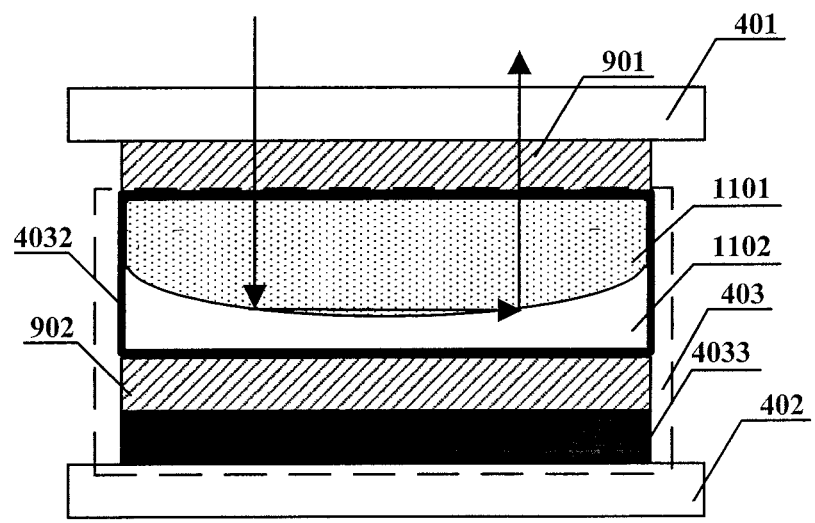
FIG. 12 is a schematic view of a reflection type display device according to an embodiment of the present disclosure.

The second part 1102 made of the electroactive deformable material in the refractive deformation member 4032 is deformed under the action of a field voltage of the first electrode 901 and the second electrode 902 to switch between the first state and the second state. As shown in FIG. 12, in the first state, incident light through the upper transparent substrate 401 is totally reflected at a boundary between the first part 1101 and the second part 1102 made of the electroactive deformable material. As shown in FIG. 11, in the second state, incident light through the upper transparent substrate 401 passes through the first part 1101 and the second part 1102 made of the electroactive deformable material, and is absorbed by the black absorption layer 4033.

In some embodiments of the present disclosure, material of the upper transparent substrate 401 may include a glass material.

In some embodiments of the present disclosure, the first electrode 901 may include an ITO electrode.

In some embodiments of the present disclosure, in the case that the second electrode 902 is combined with the black absorption layer 4033 to be provided as a black electrode, material of the black electrode may include: Mn metal or Cr metal.

In some embodiments of the present disclosure, in the case that the second electrode 902 is provided on the black absorption layer 4033, the second electrode 902 may include: the ITO electrode; and material of the black absorption layer 4033 may include: a resin material.

In some embodiments of the present disclosure, the electroactive deformable material for manufacturing the first part 903 having the refractive index greater than the set value and the electroactive deformable material for manufacturing the second part 1102 having the refractive index less than the set value may be a conductive polymer or a liquid crystal elastomer.

Figure 13:
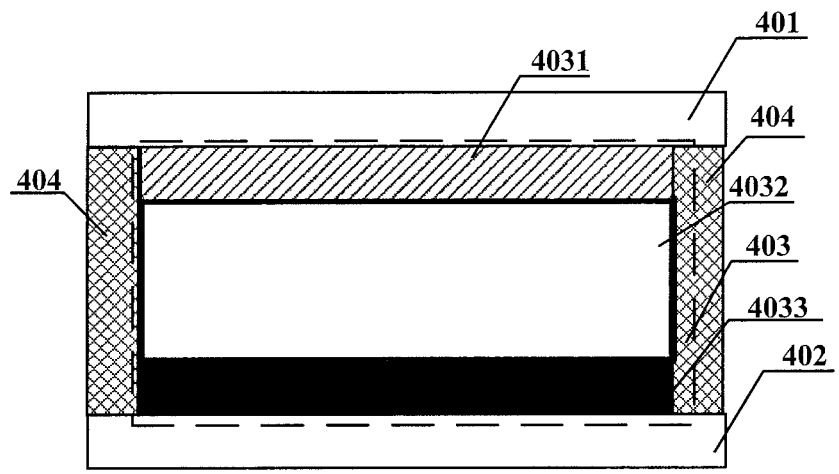
FIG. 13 is a schematic structural view of a reflection type display device with walls according to an embodiment of the present disclosure.

In the above embodiments, walls may be provided at two sides of the display unit 403. As shown in FIG. 13, crosstalk among the display units 403, which affects the display effect, can be avoided by the walls 404 separating the display units 403.

Figure 14:
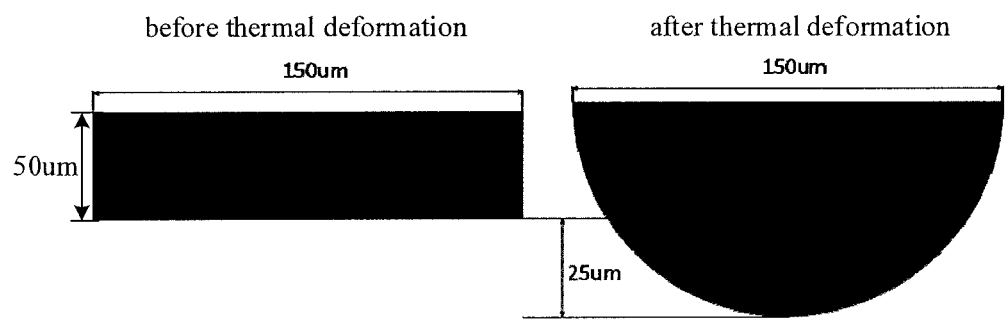
FIG. 14 is a schematic view showing a difference between specifications of a deformable material before and after deformation according to an embodiment of the present disclosure.

In the above embodiments, the greater the difference between the refractive indexes of the two materials in the refractive deformation member 4032 becomes, the smaller the degree of the deformation is required. Conversely, the smaller the difference between the refractive indexes of the two materials becomes, the greater the degree of deformation is required. FIG. 14 shows a difference between specifications before and after deformation. Before the deformation, a thickness of the deformable material is 50 µm; and after the deformation, a maximum thickness of the deformable material can be 75 µm.

The present disclosure further provides in some embodiments a display apparatus including the reflection type display device provided in the above embodiments of the present disclosure.

The above descriptions are merely optional embodiments of the present disclosure and illustrations of the principles of the applied technologies. Those skilled in the art should know that the scope of the invention referred to in the present disclosure is not limited to the technical solutions formed by particular combinations of the above technical features, and should also cover other technical solutions formed by any combination of the above technical features or equivalent features thereof without departing from the idea of present disclosure, such as technical solutions formed by replacing the above features with the technical features having similar functions disclosed by the present disclosure (but not limited thereto).

What is claimed is:

1. A reflection type display device, comprising:
an upper transparent substrate;
a lower substrate; and
a display unit provided between the upper transparent substrate and the lower substrate, the display unit comprising an electrode, a refractive deformation member and a black absorption layer;
wherein the refractive deformation member is configured to deform under control of the electrode to switch between a first state and a second state; and
wherein in the first state, incident light through the upper transparent substrate is totally reflected by the refractive deformation member, to form a bright state; and in the second state, incident light through the upper transparent substrate passes through the refractive deformation member and is absorbed by the black absorption layer, to form a dark state,
wherein the refractive deformation member comprises:
a first part having a refractive index greater than a set value; and
a second part having a refractive index less than the set value;
wherein the first part is made of a deformable material and the second part is a gas or a liquid; or, the first part is a gas or a liquid and the second part is made of a deformable material;
wherein the electrode is a heating electrode; the refractive deformation member is provided between the electrode and the black absorption layer; and the first part is made of a deformable material and the second part is a gas or a liquid.

2. The reflection type display device according to claim 1, wherein the first part is made of a thermal expansion material; the first part is in the first state when thermally expanded under control of the heating electrode; and the first part is in the second state when not thermally expanded.

3. The reflection type display device according to claim 1, wherein the first part is made of a negative thermal expansion material; the first part is in the first state when not deformed; and the first part is in the second state when contracted under the control of the heating electrode.

4. A reflection type display device, comprising:
an upper transparent substrate;
a lower substrate; and
a display unit provided between the upper transparent substrate and the lower substrate, the display unit comprising an electrode, a refractive deformation member and a black absorption layer;
wherein the refractive deformation member is configured to deform under control of the electrode to switch between a first state and a second state; and
wherein in the first state, incident light through the upper transparent substrate is totally reflected by the refractive deformation member, to form a bright state; and in the second state, incident light through the upper transparent substrate passes through the refractive deformation member and is absorbed by the black absorption layer, to form a dark state,
wherein the refractive deformation member comprises:
a first part having a refractive index greater than a set value; and
a second part having a refractive index less than the set value;
wherein the first part is made of a deformable material and the second part is a gas or a liquid; or, the first part is a gas or a liquid and the second part is made of a deformable material;
wherein the electrode is a heating electrode; the electrode is provided on the black absorption layer, or, the electrode and the black absorption layer are combined as a black electrode; and the first part is a gas or a liquid, and the second part is made of a deformable material.

5. The reflection type display device according to claim 4, wherein the second part is made of a negative thermal expansion material; the second part is in the first state when contracted under the control of the heating electrode; and the second part is in the second state when not deformed.

6. The reflection type display device according to claim 4, wherein the second part is made of a thermal expansion material; the second part is in the first state when not deformed; and the second part is in the second state when thermally expanded under the control of the heating electrode.

7. The reflection type display device according to claim 1, wherein material of the upper transparent substrate comprises: a glass material.

8. The reflection type display device according to claim 1, wherein material of the black absorption layer comprises: a resin material.

9. The reflection type display device according to claim 1, wherein the electrode comprises: an indium tin oxide (ITO) electrode.

10. The reflection type display device according to claim 1, wherein the thermal expansion material comprises: a Polydimethylsiloxane (PDMS) material.

11. The reflection type display device according to claim 1, wherein the second part comprises: air.

12. The reflection type display device according to claim 4, wherein in the case that the electrode and the black absorption layer are combined as the black electrode, the material of the black electrode comprises: manganese (Mn) metal or chromium (Cr) metal; and
wherein in the case that the electrode is provided on the black absorption layer, the electrode comprises: an indium tin oxide (ITO) electrode.

13. The reflection type display device according to claim 4, wherein the first part comprises: silicone oil.

14. The reflection type display device according to claim 1, wherein the electrode comprises a first electrode and a second electrode; the first electrode is provided between the upper transparent substrate and the refractive deformation member; the second electrode is provided between the refractive deformation member and the black absorption layer, or the second electrode and the black absorption layer are combined as a black electrode; and wherein the first part is made of an electroactive deformable material, the second part is a gas or a liquid, and the first part is deformed under control of a field voltage of the first electrode and the second electrode to switch between the first state and the second state; or, the first part is a gas or a liquid, the second part is made of an electroactive deformable material, and the second part is deformed under control of a field voltage of the first electrode and the second electrode to switch between the first state and the second state.

15. The reflection type display device according to claim 14, wherein the first electrode comprises: an ITO electrode;

wherein in the case that the second electrode and the black absorption layer are combined as the black electrode, material of the black electrode comprises: Mn metal or Cr metal; and wherein in the case that the electrode is provided on the black absorption layer, the second electrode comprises: an ITO electrode.

16. The reflection type display device according to claim 13, wherein the electroactive deformable material comprises: a conductive polymer or a liquid crystal elastomer.

17. The reflection type display device according to claim 1, further comprising walls provided at two sides of the display unit.

18. A display apparatus, comprising a reflection type display device, wherein the reflection type display device comprises:

an upper transparent substrate;

a lower substrate; and a display unit provided between the upper transparent substrate and the lower substrate, the display unit comprising an electrode, a refractive deformation member and a black absorption layer;

wherein the refractive deformation member is configured to deform under control of the electrode to switch between a first state and a second state; and wherein in the first state, incident light through the upper transparent substrate is totally reflected by the refractive deformation member, to form a bright state; and in the second state, incident light through the upper transparent substrate passes through the refractive deformation member and is absorbed by the black absorption layer, to form a dark state, wherein the refractive deformation member comprises:

a first part having a refractive index greater than a set value; and a second part having a refractive index less than the set value;

wherein the first part is made of a deformable material and the second part is a gas or a liquid; or, the first part is a gas or a liquid and the second part is made of a deformable material;

wherein the electrode is a heating electrode; the refractive deformation member is provided between the electrode and the black absorption layer; and the first part is made of a deformable material and the second part is a gas or a liquid.

\* \* \* \* \*